US006807358B2

(12) United States Patent
Jones et al.

(10) Patent No.: US 6,807,358 B2
(45) Date of Patent: Oct. 19, 2004

(54) VARIABLE ATTENUATOR FOR OPTICAL FIBER APPLICATIONS AND METHOD OF MAKING

(75) Inventors: Marc D. Jones, Lithonia, GA (US); Sean L. Jones, Clarkston, GA (US); Francis G. McCormack, Cumming, GA (US); David N. Ridgway, Conyers, GA (US); Ian A. White, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 27 days.

(21) Appl. No.: 10/232,078

(22) Filed: Aug. 30, 2002

(65) Prior Publication Data

US 2004/0042757 A1 Mar. 4, 2004

(51) Int. Cl.[7] .............................. G02B 6/00; G02B 6/38
(52) U.S. Cl. ........................... 385/140; 385/70; 385/72
(58) Field of Search .......................... 385/140, 78, 77, 385/76, 53, 55, 70, 72, 84, 56, 73, 59, 60, 134, 139; 264/1.25; 350/96.21, 96.2, 96.18, 96.22, 96.15, 96.29, 320

(56) References Cited

U.S. PATENT DOCUMENTS

| | | | | |
|---|---|---|---|---|
| 4,353,620 A | * | 10/1982 | Schultz | 385/70 |
| 4,544,234 A | | 10/1985 | DeVeau, Jr. et al. | 350/96.21 |
| 4,691,986 A | | 9/1987 | Aberson, Jr. et al. | 350/96.21 |
| 4,850,670 A | * | 7/1989 | Mathis et al. | 385/72 |
| 4,856,865 A | * | 8/1989 | Lee | 385/67 |
| 4,986,627 A | | 1/1991 | Boscher et al. | 350/96.21 |
| 5,031,994 A | * | 7/1991 | Emmons | 385/16 |
| 5,136,681 A | * | 8/1992 | Takahashi | 385/140 |
| 5,319,728 A | * | 6/1994 | Lu et al. | 385/140 |
| 5,319,733 A | * | 6/1994 | Emmons et al. | 385/140 |
| 5,734,778 A | * | 3/1998 | Loughlin et al. | 385/140 |
| 5,751,874 A | * | 5/1998 | Chudoba et al. | 385/72 |
| 5,805,760 A | * | 9/1998 | Serafini et al. | 385/140 |
| 6,311,010 B1 | * | 10/2001 | Medeiros | 385/140 |
| 6,341,191 B1 | * | 1/2002 | Takahashi | 385/140 |
| 6,707,980 B2 | * | 3/2004 | Holman et al. | 385/140 |

FOREIGN PATENT DOCUMENTS

JP    64-55514    *    3/1989    ................ 385/140

* cited by examiner

Primary Examiner—John R. Lee
Assistant Examiner—James P. Hughes
(74) Attorney, Agent, or Firm—Thomas, Kayden, Horstemeyer & Risley, LLP

(57) ABSTRACT

A variable attenuator has first and second substantially identical ferrules or capillaries, each being mounted in a barrel or splice housing and extending toward each other, with their distal ends being separated by a gap of a first width. The width of the gap is controlled by a sleeve into which the ferrules are inserted, the ends of the sleeve butting against the front faces of the barrels. The ferrules are made by producing a glass rod mounted between the barrels and having a bore offset from and parallel to the centerline of the rod and breaking or cleaving the rod at its longitudinal center. The broken ends are then polished. The barrels are keyed to a housing member so that the offset bores are coincident in the zero position as defined by the keys.

10 Claims, 3 Drawing Sheets

VARIABLE ATTENUATOR FOR OPTICAL FIBER APPLICATIONS AND METHOD OF MAKING

RELATED APPLICATIONS

This application deals with subject matter similar to that in U.S. patent application Ser. No. 10/061,601 of Robert Holman, et al, filed Jan. 31, 2002, the disclosure of which is incorporated herein by reference.

FIELD OF THE INVENTION

This invention relates to end-to-end connection of optical fibers, and more particularly, to a variable attenuator for use in such connections.

BACKGROUND OF THE INVENTION

Fiber optics has become, in most cases, the preferred mode of signal transmission, especially where the signals are in the higher frequencies. Optical fibers produce greatly increased bandwidth over conventional electrical conductors, and are relatively immune to ambient conditions that can disrupt electrical signal transmission. The numerous advantages of optical fibers come with a price, however. Whereas with electrical conductors, splicing may be had by simply butt welding, soldering, or otherwise joining the ends of the conductors being spliced, such is not presently possible with optical fibers, which have a diameter of, for example 125 microns and a core diameter of from 6 to 30 microns, and, in a satisfactory splice, must permit light transmission with a minimum of insertion loss while providing a stable junction. As a consequence, there has been a constant and ongoing effort to achieve, in a connector splice arrangement, an alignment of the butting ends of the fibers to minimize insertion loss. In addition to alignment, the width of the gap between the fiber ends and the surface condition of the ends are factors which must be considered in reducing or minimizing loss. The prior art arrangements are, for the most part, dependent upon or directed toward the centering of the fiber cores, and in most instances, the fibers are contained in ferrules which have centered fiber containing bores therein. On the other hand, in U.S. Pat. No. 4,544,234 of DeVeau et al., the fibers are contained in a slotted tube and centered prior to their being cemented in place within the slot. Such an arrangement does not require centering of the bores of the ferrules, but it does not permit relative movement between the fibers for optimum transmission after the fibers are cemented in place.

In U.S. Pat. No. 4,691,986 of Aberson et al., the disclosure of which is incorporated herein by reference, there is shown an arrangement wherein alignment of the fiber containing bores of plugs or ferrules is achieved, thereby obviating at least to a large extent alignment of the fiber cores. The invention of that patent involves the use of "contiguous" plugs derived from contiguous segments of tubular stock, with the contiguous ends being the mating ends, with the rotational relationship between the plugs being that that existed prior to cutting or sectioning of the tubular stock. With such an arrangement, the fiber containing bores are automatically aligned. It doesn't matter if the bores are slightly eccentric relative to the outer diameter of the plugs, they will still be aligned, thereby enabling alignment of the fiber cores. The invention of that patent is usable in almost any of the large variety of prior art connectors wherein the fibers are contained within ferrules or plugs.

The foregoing is directed to the general problems inherent in most fiber connectors of achieving proper fiber alignment in connectors or splices. These problems also exist in various optical fiber components, such as, for example, variable attenuators. In U.S. Pat. No. 4,986,627 of Boscher et al., there is shown a variable attenuator arrangement that has abutting ferrules having substantially identical outer diameters, but with fiber containing bores which are eccentric with respect to the other diameters. The bores, each of which has a diameter substantially the same as the outer diameter of the fiber contained therein, are rotatable relative to each other to vary the alignment of the fibers relative to each other and thereby to vary the attenuation by increasing or decreasing the offset between the fiber cores. Such an arrangement requires, for optimum performance, that, at at least one rotational position, the ferrule bores are substantially aligned, thereby aligning the fiber cores at least to the extent possible with whatever eccentricity may exist for the fiber cores themselves. The Boscher et al. arrangement produces an attenuation coefficient which varies between 3 and 60 dB for fibers which are off center by 7 to 10 microns ($\mu$m) for single mode fibers. For multimode fibers, the offset from center is from 30 $\mu$m to 50 $\mu$m.

In addition to arrangements such as shown in Boscher et al, other prior art variable attenuators make use of air gaps and/or angled ferrule (and fiber) ends. Ideally, a variable attenuator should provide the needed or desired attenuation, should have low return loss, and should have stable performance in high power systems and should comprise a single unit that can be inserted within a transmission system between two fiber ends.

SUMMARY OF THE INVENTION

The present invention, hereinafter shown as embodied in a variable attenuator, overcomes or obviates many of the shortcomings of the prior art, as enumerated hereinbefore, while providing reliable desired variations in the attenuation of signals passing therethrough. It should be recognized that in many instances some level of attenuation may be desirable in order to achieve a power balance among several related transmission lines rather than simply a maximum signal power throughput.

The variable attenuator embodying the principles of the invention comprises a fiber connector having a ferrule or glass capillary mounted in a stationary holder and a butting ferrule mounted in a rotatable holder. Glass or similar material ferrules have distinct advantages over ceramic or other material ferrules. A glass ferrule spreads the energy over a large area, thereby preventing energy absorption at the ferrule end face. For high power applications this directing energy away from the end face prevents long term reductions in performance due to heat concentration. The centerlines of the two, substantially identical, ferrules are aligned, and each ferrule has a fiber containing bore extending therethrough, the bores being offset from the ferrule centerline by equal amounts, approximately 35 $\mu$m to 40 $\mu$m. The ferrules are contained in barrel members and their distal ends are spaced from each other by a gap of approximately 5$\mu$ to 15$\mu$ which is filled with an index matching material. The ferrules are contained in a sleeve of suitable material such as ceramic or metal whose ends butt against the two ferrule containing barrels and which aligns the centerlines of the two ferrules. The sleeve length is the determinant for the width of the gap when the ferrules are completely inserted therein.

Prior to final assembly, the ferrule end faces are polished, either normal to or at an angle to the centerline thereof and the barrels function as stops for the polishing mechanism, thereby insuring that the front face of each ferrule is a desired distance from the front face of the barrel. Thus, the barrel and sleeve together provide a consistent gap which may be normal to or at an angle to the centerline between the distal ends of the ferrule in the production of the attenuators, insuring consistent results among the several attenuators thus produced.

In assembly of the barrels, ferrules, and sleeve, virtual identity of the ferrules is assured by mounting a glass rod of proper diameter and having an offset bore within and extending between the barrels. The rod is then cleaved at the middle thereof, creating two, substantially identical ferrules. The barrels are keyed in a housing against accidental rotation, so that when each barrel/ferrule assembly, when removed from the housing and ferrule distal ends are polished, is replaced in the housing, and the offset bores are in approximately perfect alignment.

One of the ferrules/barrel assemblies is made rotatable with respect to the other by suitable rotating means. Initially, with both barrels keyed in the housing, the offset bores are aligned, as are the ends of the fibers contained therein, and there is substantially no attenuation (0 dB) present in the transmission line into which the attenuator is inserted. Rotation of the rotatable barrel moves the fiber ends out of registry, thereby attenuating the signal within the transmission line. In practice, it has been found that approximately 30° of rotation away from alignment produces approximately 60 dB of attenuation. Thus, the attenuator is capable of producing a range of attenuation from 0 to −60 dB.

These and other features of the present invention will be readily apparent from the following detailed description, read in conjunction with the accompanying drawings.

DETAILED DESCRIPTION

Figure 1:
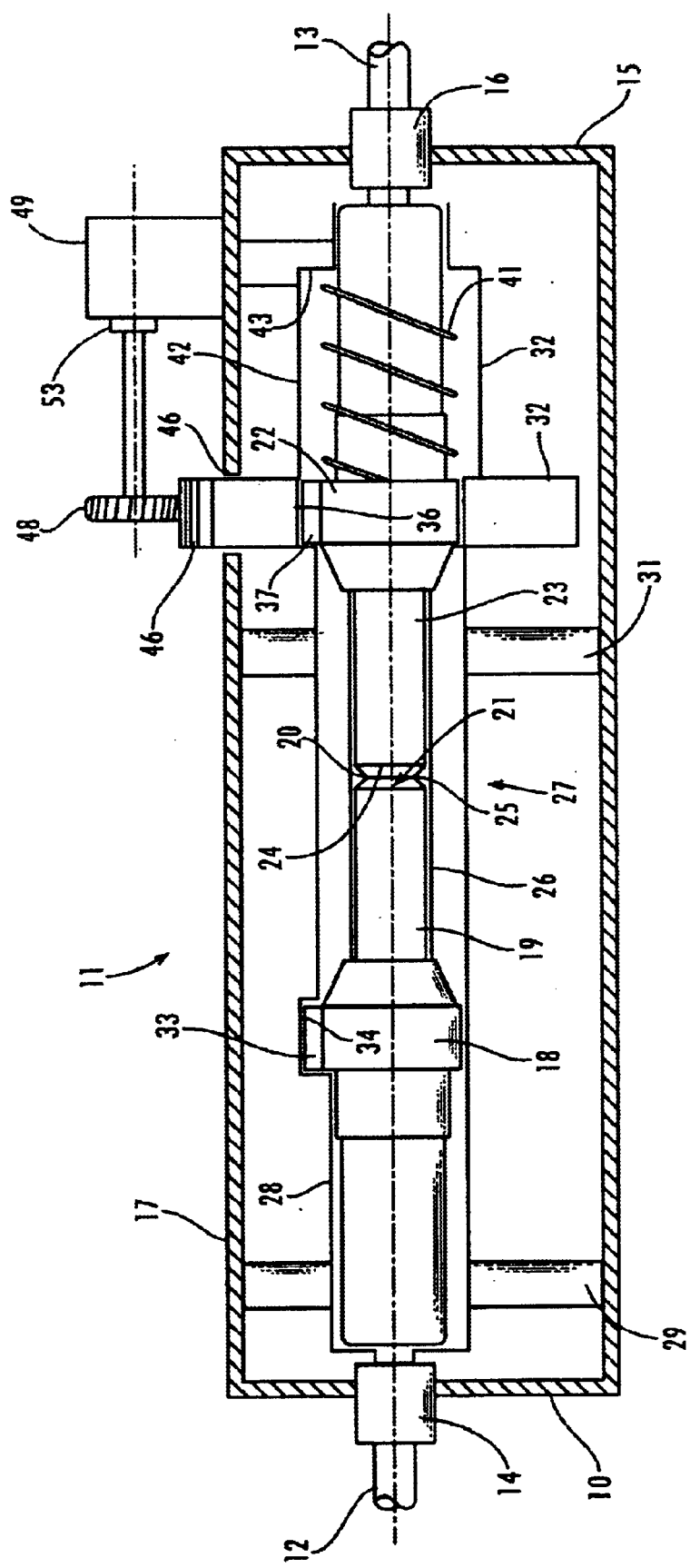
FIG. 1 is a diagrammatic elevation view of the variable attenuator of the invention.

FIG. 1 is a diagrammatic elevation view of the invention as embodied in a variable attenuator 11 which is a stand alone unit for insertion into a transmission line between connector terminated buffered optical fibers 12 and 13. Fibers 12 and 13 are coupled into unit 11 by connector and adapter combinations 14 and 16 respectively, which are shown diagrammatically as blocks, intended here to be representative of any of a number of such combinations known in the art, and which, preferably, are mounted in the ends 10 and 15 of an outer housing 17, which may be of any suitable material such as metal or plastic.

The attenuator assembly comprises a fixed rotary splice housing or barrel 18 which terminates in a capillary or ferrule 19 which contains the end of a fiber and which is ground and polished to a flat surface 21 approximately normal to the centerline of the attenuator 11, as shown, but which may be at an angle thereto. A movable rotary splice housing 22 is axially aligned with housing 18 and terminates in a second capillary or ferrule 23 which contains the end of a fiber and which is ground and polished to a flat surface 24 which abuts surface 21 preferably over the entire area thereof. Ferrules 19 and 23 are preferably made of glass. The ferrules or capillaries 19 and 23 are preferably covered and held in alignment, especially in the junction region of end faces 21 and 24, by a sleeve 26 of metal or other suitable material which, preferably, is a tight slip fit thereon. The significance and function of the sleeve will be discussed more fully with reference to FIG. 3. The attenuator assembly as thus far described is contained in a housing 27 having a first, stationary part or member 28, mounted to outer housing 17 by any suitable means such as brackets 29, 31, and a movable part or member 32 which is rotatable with respect to member 28. Rotary splice housing 18 is prevented from rotating within member 28 by a key 33 thereon, which fits in a keyway 34 in member 28. It is to be understood that other means for preventing rotation of member 18 might readily be used, that shown here being one alternative. Movable member 32 likewise has a similar keyway 36 into which a key 37 on rotary splice housing 22 fits. Member 32 is rotatably attached to member 28, and, when rotated with respect thereto, causes splice housing 22 to rotate also, and as a consequence, capillary or ferrule 23 to rotate relative to capillary or ferrule 19. In order that the faces 21 and 24 of the ferrules 19 and 23 be protected from damage during rotation they are separated by a gap 20 filled with index matching materials 25. A coil spring 41 is housed in an enlarged portion 42 of member 32 and bears against an enlarged portion of housing 22 and the rear wall 43 of member 32 as shown. The dimensions of the spring 41 and the enlarged portion 42 of member 32 are such that the spring 41 is under compression when the apparatus is assembled, thereby holding the front face of housing 22 firmly against the end of sleeve 26.

Figure 4:
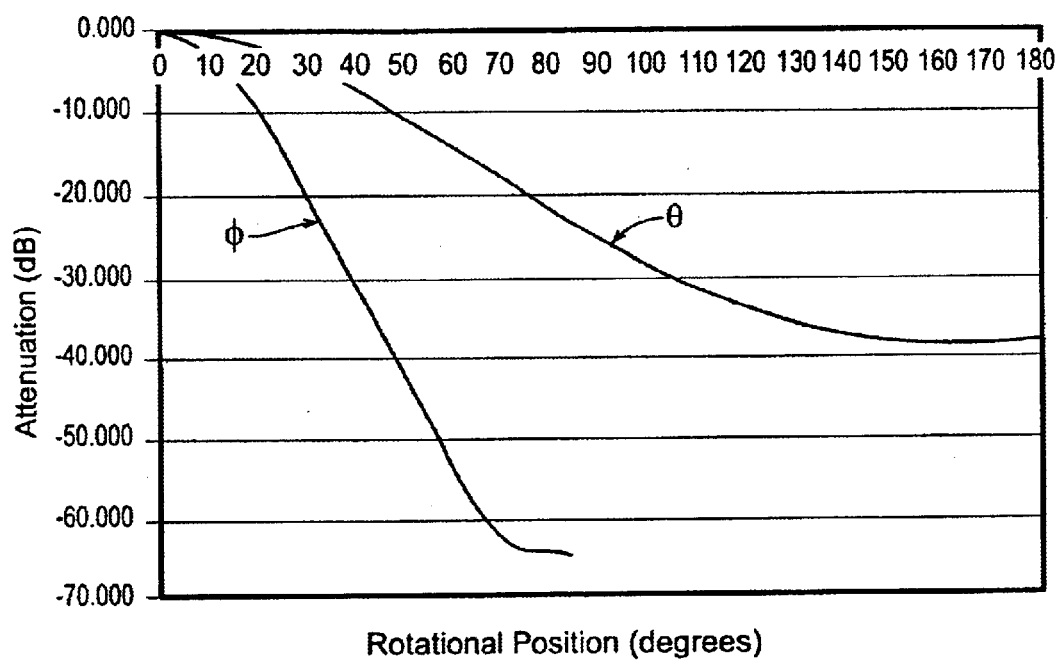
FIG. 4 is a graph illustrating the performance of the attenuator of the present invention.

Rotation of portion or member 32 is by means of an enlarged control wheel 46 which forms part of member 32 and which penetrates to the exterior through a slot 47 in outer housing 17. Rotation of the wheel produces rotation of member 32 and therefore, of housing 22 and ferrule 23. Wheel 46 may be a knurled wheel or, for example, a spur gear or worm driver gear and can be rotated manually or by a driving wheel, gear, or worm 48 driven by a control member 49, preferably a motor. Inasmuch as very small displacement of the wheel 46 will produce substantial variation in attenuation as shown in FIG. 4 it is preferable, although not necessary, that a gearing arrangement for moving wheel 46 be used.

Figure 2A:
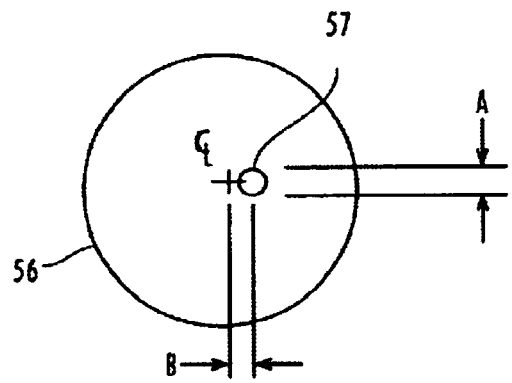
FIG. 2A is a diagrammatic end view of a ferrule showing the offset of the fiber containing bore from the ferrule centerline.
Figure 2B:
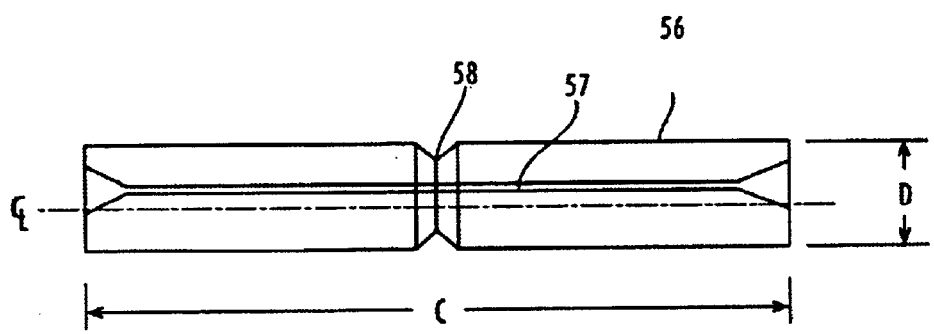
FIG. 2B is a side elevation view of a ferrule blank prior to cleaving to make two substantially identical ferrules.

FIGS. 2A and 2B are diagrammatic views of a glass rod 56, having a diameter D of approximately 2.49±0.005 mm from which the ferrules or capillaries 19 and 23 are made. Rod 56 has a bore 57 extending therethrough of a diameter A of approximately 126–129 microns which is displaced from the centerline of rod 56 a distance B of approximately 35–40 microns, and which is parallel to the centerline of rod 56. It is to be understood that different dimensions given herein are preferred for an attenuator for use with single mode fibers having a diameter of 125 microns, but it is to be understood that the values may be called for with different fiber sizes.

In fabricating the attenuator 11, the glass rod 56 is mounted between and affixed to splice housings or barrels 18 and 22, which, in turn, are keyed to their housings 28 and 32. A notch 58 is formed in rod 56 at the midpoint of the length thereof and the glass rod 56 is broken or cleaved at this point. The splice housings or barrels 18 and 22 at this point hold rough ferrules that are substantially identical, with fully mating bores 57 which also defines the zero attenuator position of the keys. It has been found that ceramic or other material ferrules are not amenable to the breaking and polishing for producing the desired results.

FIGS. 2A and 2B are diagrammatic views of a glass rod 56, having a diameter D of approximately 2.49±0.005 mm from which the ferrules or capillaries 19 and 23 are made. Rod 56 has a bore 57 extending therethrough of a diameter A of approximately 126–129 microns which is displaced from the centerline of rod 56 a distance B of approximately 35–40 microns, and which is parallel to the centerline of rod 56. It is to be understood that different dimensions given herein are preferred for an attenuator for use with single mode fibers having a diameter of 125 microns, but it is to be understood that the values may be called for with different fiber sizes.

Figure 3:
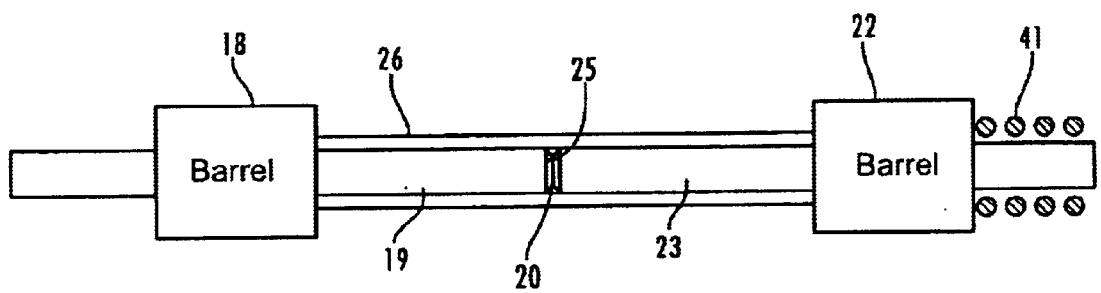
FIG. 3 is a partial diagrammatic view of the ferrule/sleeve/barrel assembly.

The ferrules 19 and 23 are then inserted into sleeve 26, with the front faces of barrels or splice housings 18 and 22 butting against the ends of sleeve 26. The length of sleeve 26 is so chosen that there is a gap 20 between the ferrule end faces, which is filled with index matching material 25 such as a matching gel. With the foregoing assembly, with keys 33 and 37 in their respective keyways 34 and 36, the offset bores 57 in the ferrules are aligned, as are the fiber therein. In operation, rotation of member 46 and hence, housing 22, produces rotation of end face 24 of ferrule 23 relative to end face 21 of ferrule 19. The gap 20 and matching gel 25 prevent such rotation from causing damage to the end faces. In FIG. 3 the barrel 18, 22 and sleeve 26 arrangement is shown whereby sleeve 26 governs the width of the gap, which, desirably, is from 5 $\mu$m to 15 $\mu$m. The ends of sleeve 26 butt against the front faces of the barrels 18 and 22, thereby preventing the end faces 21 and 24 from contacting each other. If, in the initial assembly, it is found that the gap 20 thus formed is too wide, it is reduced by grinding one of the ends of sleeve 26 until the desired gap width is achieved. The spring 41 bears against barrel 22 to force it against the sleeve 26, which is, as a result, forced against the front face of barrel or housing 18.

With the width of gap 20 thus set within the range of 5 $\mu$m to 15 $\mu$m, and it is filled with an index matching material 25, such as silica gel, barrel 22 can then be rotated without damaging end faces 21 and 24 to vary the attenuation in the transmission system, comprising, in the present embodiment, fibers 12 and 13. The results of the rotation are shown in FIG. 4, curve Ø, as contrasted with the rotation of the ferrules in the aforementioned U.S. patent application Ser. No. 10/061,601 as shown in curve θ. It can be seen from these curves that the present invention, as represented by curve Ø produces the same amount of attenuation, starting at 0 dB, in 45° of rotation as does the prior apparatus in approximately 160° of rotation. Furthermore, because of its unique structure, the attenuation of the invention has a range of from 0 dB to –65 dB, which is reached in approximately 75° of rotation, as compared to the prior attenuation which has a range of from approximately 0 dB to –38 dB.

From the foregoing, it can be seen that the variable attenuator of the invention produces a wide range of attenuation, extending from zero attenuation, in a relatively small amount of rotation and comprises a relatively simple, reproducible unit adaptable to a wide range of transmission arrangements.

It is to be understood that the various features of the present invention might be incorporated into other variable attenuator mechanism, and that other modifications or adaptations might occur to workers in the art. All such variations and modifications are intended to be included herein as being within the scope of the present invention as set forth in the claims. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. A variable attenuator device for varying signal attenuation within an optical fiber transmission system, said device comprising:

first and second substantially identical ferrules, each of said ferrules being mounted in first and second spaced barrels, respectively;

each of said ferrules having a fiber containing bore therein offset from the ferrule centerline the same distance, said ferrules having substantially identical distal ends;

said ferrules extending toward each other, with their distal ends separated by a gap having a first width;

a tubular sleeve member at each end of which one of said ferrules is inserted until the ends of said sleeve butt against said first and second barrels, said sleeve having a length greater than the combined length of said first and second ferrule by said first width of said gap; and said second ferrule being rotatable with respect to said first ferrule while said first width of said gap is maintained throughout relative rotation of said ferrules.

2. A variable attenuator as claimed in claim 1 wherein each of said first and second ferrules is made of glass.

3. A variable attenuator as claimed in claim 1 wherein said gap has an index matching material therein.

4. A variable attenuator as claimed in claim 1 wherein said gap is from 0.5 $\mu$m to 15 $\mu$m in width.

5. A variable attenuator device for varying the attenuation in a single mode optical fiber system, said device comprising:

an outer housing member having a first and second end;

an inner housing having a stationary portion affixed to said outer housing and a rotatable portion rotatable with respect to said stationary portion;

a first barrel member contained within said stationary portion and fixed in position therein and a second barrel member contained within and fixed to said rotatable portion;

said first barrel member having a first glass ferrule projecting from one end thereof, said first ferrule having a bore therein offset from the centerline of said first ferrule and containing the fixed end of a first optical fiber;

said second barrel member having a second glass ferrule substantially identical to said first ferrule projecting from one end thereof toward said first ferrule and having its centerline aligned with the centerline of said first ferrule, and containing the fixed end of a second optical fiber;

said first and second ferrules having their distal ends separated by a gap having a first width;

a sleeve member surrounding said first and second ferrules, said sleeve member having a first end butting against said one end of said first barrel and a second end butting against said one end of said second barrel, and having a length equal to the combined lengths of said first and second ferrules plus the width of said gap.

6. A variable attenuator device as claimed in claim 5 wherein the width of said gap is approximately 0.5 microns (+0.5 $\mu$m) to 15 microns (15 $\mu$m).

7. A variable attenuator device as claimed in claim 5 wherein said first barrel member has a key thereon and said stationary portion has a keyway mated with said key to prevent rotation of said first barrel member.

8. A variable attenuator device as claimed in claim 7 wherein said second barrel member has a second key thereon and said rotatable portion has a second keyway mated with said second key to force said second barrel member to rotate with said rotatable portion.

9. A variable attenuator device as claimed in claim 5 and further including biasing means for biasing said second barrel member into contact with said second end of said sleeve member and said first end of said sleeve member is biased into contact with said one end of said first barrel member.

10. A variable attenuator device as claimed in claim 5 and further comprising an apparatus for rotating said rotatable portion while maintaining the first width of said gap constant throughout rotation.

* * * * *